(12) United States Patent
Berent et al.

(10) Patent No.: US 7,107,585 B2
(45) Date of Patent: Sep. 12, 2006

(54) COMPILATION OF APPLICATION CODE IN A DATA PROCESSING APPARATUS

(75) Inventors: Anthony Neil Berent, Cambridge (GB); Jonathan William Brawn, Austin, TX (US); Paul Robert Gotch, Cambridge (GB)

(73) Assignee: ARM Limited, Cambridge (GB)

( * ) Notice: Subject to any disclaimer, the term of this patent is extended or adjusted under 35 U.S.C. 154(b) by 607 days.

(21) Appl. No.: 10/206,830

(22) Filed: Jul. 29, 2002

(65) Prior Publication Data

US 2004/0019886 A1 Jan. 29, 2004

(51) Int. Cl.
*G06F 9/45* (2006.01)
*G06F 9/445* (2006.01)

(52) U.S. Cl. .................. 717/154; 717/128; 717/140
(58) Field of Classification Search ........ 717/139–140, 717/146–148, 150–156, 127–129, 141
See application file for complete search history.

(56) References Cited

U.S. PATENT DOCUMENTS

| | | | | |
|---|---|---|---|---|
| 5,355,487 A * | 10/1994 | Keller et al. | ................ | 717/127 |
| 5,530,964 A | 6/1996 | Alpert et al. | | |
| 5,774,724 A * | 6/1998 | Heisch | ................ | 717/129 |
| 5,926,639 A * | 7/1999 | Richardson | ................ | 717/156 |
| 6,178,525 B1 * | 1/2001 | Warren | ................ | 714/37 |
| 6,311,325 B1 * | 10/2001 | Levine et al. | ................ | 717/128 |
| 6,381,735 B1 * | 4/2002 | Hunt | ................ | 717/158 |
| 6,662,359 B1 * | 12/2003 | Berry et al. | ................ | 717/130 |
| 6,683,459 B1 * | 1/2004 | Dindis et al. | ................ | 324/534 |
| 6,691,301 B1 * | 2/2004 | Bowen | ................ | 717/114 |
| 6,728,949 B1 * | 4/2004 | Bryant et al. | ................ | 717/127 |
| 6,754,889 B1 * | 6/2004 | Leverenz | ................ | 717/127 |
| 6,826,717 B1 * | 11/2004 | Draper et al. | ................ | 714/39 |

OTHER PUBLICATIONS

Fink et al, "Design implementaion and evaluation of adaptive recompilation with on stack repalcement", IEEE, pp. 241-252, 2003.*
Cong et al, "Technology mapping and architecture evaluation for K/m macrocell based FPGAs", ACM Trans. for Design Automation on Electronic System, vol. 10, No. 1, pp. 3-23, 2005.*
Tolmach et al, "Debuggable concurrency extensions for standard ML", ACM pp. 120-131, 1991.*
Helms et al, "Event monitoring in a system on a chip", IEEE, pp. 233-237, 1999.*

* cited by examiner

*Primary Examiner*—Anil Khatri
(74) *Attorney, Agent, or Firm*—Nixon & Vanderhye P.C.

(57) ABSTRACT

The present invention relates to a data processing apparatus and method for compiling application code. The data processing apparatus comprises a processor, and a compiler for compiling application code to generate instructions for execution by the processor. Furthermore, a non-invasive trace unit is coupled to the processor for generating, from input signals received from the processor, trace signals indicative of the instructions being executed by the processor. The compiler is then arranged to control the compilation of the application code dependent on the trace signals. The non-invasive nature of the trace unit enables it to generate trace signals that can be used to produce profiling information for use by the compiler without altering the behaviour of the code being executed by the processor, and accordingly provides a significantly improved technique for obtaining profiling information for use in feedback driven optimization compilation techniques.

50 Claims, 7 Drawing Sheets

COMPILATION OF APPLICATION CODE IN A DATA PROCESSING APPARATUS

BACKGROUND OF THE INVENTION

1. Field of the Invention

The present invention relates to the compilation of application code in a data processing apparatus.

2. Description of the Prior Art

Prior to running application code on a processor, it is first necessary to compile that application code in order to generate from the application code a sequence of instructions representing that application code, that sequence of instructions then being executed on the processor.

A well-known technique for improving the performance of fully or partially compiled code is Feedback Driven Optimisation (FDO). In accordance with this technique, the compiled code is executed on a processor of a data processing system, and the performance of that system is profiled, with this profiling information then being used by the compiler to decide how to modify the compiled code. In fully, statically, compiled languages, such as C and C++, the profiling information is collected in a test run, during which the originally compiled code is executed on a target processor. Once the test run has been completed, the profiling information is used to control the recompilation of the code by the compiler. It is the recompiled version of the code that is then subsequently used.

In dynamically compiled languages, the compiler will typically allow portions of the application code to be dynamically compiled during run time. One example of a dynamically compiled language is the JAVA™ programming language as specified by Sun Microsystems Inc. The JAVA™ programming language seeks to provide an environment in which computer software written in JAVA™ can be executed upon many different processing hardware platforms without having to alter the JAVA™ software. In JAVA™, the run-time system includes a bytecode compiler allowing the JAVA™ bytecodes (i.e. the JAVA™ application code) to be compiled at run-time into native code for the processor on which the software is running. In practice, the bytecode compiler will not compile all of the JAVA™ bytecodes, but instead the initial bytecode stream is interpreted by interpreter code, and based on the performance of the interpreted version of the application code, some of it may then be compiled by the bytecode compiler into native code.

It is possible in such dynamically compiled systems to use profiling information to select dynamically which sections of the application code should be compiled, this being known in the JAVA™ environment as Adaptive Dynamic Compilation (ADC). The aim of such ADC techniques is to improve the performance of a system as it is running.

There are a number of known techniques for obtaining the profiling information. One such technique involves "instrumentation" of the code, which involves adding additional instructions into the sequence of instructions generated by the compiler from the application code (or in the case of dynamically compiled languages such as JAVA™, adding additional instructions into the relevant parts of the interpreter code), to cause predetermined profiling information to be stored when those additional instructions are executed. As an example, the instrumentation process may involve adding an additional instruction into an instruction sequence which forms the body of a loop, whereby each time that additional instruction is encountered, it causes a counter to be incremented, thereby in effect keeping count of the number of times that loop is iterated. That piece of profiling information, along with other pieces of profiling information obtained as a result of further instructions added during the instrumentation process, can then be used to optimise the compilation by the compiler.

An alternative to the instrumentation approach is to use sample based profiling techniques, which involve interrupting the processor at predetermined points to enable performance counters to be read via a JTAG interface, or to be saved into memory. More details on feedback driven optimisation is provided in the article "Feedback directed optimisation in Compaq's compilation tools for Alpha" by Robert Cohn et al, which appeared in the $2^{nd}$ ACM Workshop on Feedback-Directed Optimisation, Haifa, Israel, Nov. 15, 1999.

The problem with both of the above techniques is that they are intrusive, and significantly alter the behaviour of, and slow down, the code that they are attempting to optimise. For instance, the instrumentation technique involves adding additional instructions into the instruction sequence which hence materially alters the instruction sequence. Similarly, the sample based profiling technique involves interrupting the execution at predetermined points, which would not occur during normal execution of the compiled code. Hence, both techniques tend to adversely affect the accuracy of the information collected, particularly in realtime systems. Furthermore, in dynamic compilation implementations such as the above described JAVA™ case, the amount of information collected to decide what to compile has to be carefully balanced against the cost (e.g. in terms of performance, increased size of code, etc) of collecting that information.

It would hence be desirable to provide an improved technique for obtaining profiling information for use in such FDO techniques.

SUMMARY OF THE INVENTION

Viewed from a first aspect, the present invention provides a data processing apparatus, comprising: a processor; a compiler for compiling application code to generate instructions for execution by the processor; a non-invasive trace unit coupled to the processor for generating, from input signals received from the processor, trace signals indicative of the instructions being executed by the processor; the compiler being arranged to control the compilation of the application code dependent on the trace signals.

In accordance with the present invention, a non-invasive trace unit is arranged to generate from input signals received from the processor trace signals indicative of the instructions being executed by the processor, and the compiler is arranged to control the compilation of the application code dependent on the trace signals. By using a non-invasive trace unit as the source of the profiling information, the earlier described problems of FDO techniques are significantly alleviated. In particular, the information collected is accurate since the instruction sequence being monitored will execute in its intended manner (without the need to execute any additional instructions, and without the need to interrupt the execution).

Furthermore, in statically compiled languages, the trace signals can be collected and analysed by a separate computer, for example using the standard trace interfaces. This will have no impact whatsoever on the behaviour or performance of the processor. The collected information can then be fed into the compiler in the same way as in classical FDO techniques. For dynamically compiled languages such as JAVA™, a separate application thread would typically be provided to read and analyse the trace signals generated by the trace unit, with the result of this analysis then being fed back into the compiler for use in determining which parts of the application code should be compiled. Whilst this will have some effect on the performance on the overall system, it would typically be significantly less than the impact resulting from the collection of such information using the earlier described prior art techniques. Further, it should be noted that because this overhead does not specifically occur when the code being analysed is executed by the processor, it does not in any way distort the accuracy of the profiling information obtained.

It will be appreciated that the non-invasive trace unit may be located anywhere within the data processing apparatus. However, in preferred embodiments, the non-invasive trace unit and the processor are provided on the same chip, thereby improving the performance of the trace signal generation process. More particularly, in preferred embodiments, the non-invasive trace unit is an embedded trace macrocell, such as that provided by ARM Limited, Cambridge, England, in association with various ARM processors. Such Embedded Trace Macrocells (ETMs) produce in realtime a trace stream of data representing activities of the data processing system that are desired to be traced. This trace stream can then subsequently be used to facilitate debugging of sequences of processing instructions being executed by the data processing system. The inventors of the present invention realised that it would be possible to use such an existing ETM to generate trace signals that could be used to form the profiling information required to control the compilation of application code by the compiler, thus resulting in a non-invasive technique for generating the required profiling information.

It will be appreciated that in certain embodiments it may be possible for the trace signals produced by the non-invasive trace unit to be used directly by the compiler. However, in preferred embodiments, the trace signals would typically require some analysis in order to generate the required profiling information needed by the compiler. Accordingly, in preferred embodiments, the data processing apparatus further comprises: a trace analyser for deriving from the trace signals performance data for use in controlling the compilation of the application code by the compiler.

In one embodiment, the performance data is input directly into the compiler for use by the compiler in controlling the compilation of the application code. However, in an alternative embodiment, the data processing apparatus further comprises a pre-processor operable to receive the performance data and to modify the application code to be compiled by the compiler. Thus the compiler then receives a modified version of the application code for compilation which has already taken into account the performance data derived from the trace signals.

It will be appreciated by those skilled in the art that the performance data can take a variety of forms. However, in preferred embodiments, the performance data comprises data identifying frequency of execution of sequences of instructions. Alternatively, or in addition, the performance data may also comprise data identifying execution time of sequences of instructions, i.e. the length of time it takes a particular sequence of instructions to execute.

It will be appreciated that the non-invasive trace unit can be arranged to generate trace signals indicative of a variety of different events taking place during execution of instructions by the processor. However, as a minimum, the non-invasive trace unit is preferably arranged to generate trace signals identifying branches in instruction flow. As will be appreciated by those skilled in the art, instructions will be executed sequentially between each branch, and accordingly from information identifying the branches, it is possible to build up information about the complete flow of instructions executed by the processor, and hence to generate appropriate information for use by the compiler in controlling the compilation of the application code.

It will be appreciated that the trace signals generated by the non-invasive trace unit can be routed via any appropriate mechanism for subsequent analysis. However, in preferred embodiments, the data processing apparatus further comprises: a trace buffer for storing the trace signals for subsequent analysis prior to feedback to the compiler. The use of a trace buffer is advantageous, since it is expected that the volume of trace signals generated will vary over time, and the buffering of the trace signals avoids the requirement for the analysis and feedback to the compiler to take place "on the fly" as the trace signals are generated.

It is envisaged that the present invention can be utilised with either statically compiled languages or dynamically compiled languages. For statically compiled languages, then in preferred embodiments the processor is a target processor and the compiler is compiler code to be executed on a host processor different to the target processor.

More particularly, in preferred embodiments, the application code as compiled by the compiler code is executed in test mode on the target processor, and the compiler code is arranged to re-compile the application code dependent on the trace signals generated by the non-invasive trace unit.

In embodiments where a trace analyser is used to generate performance data for the compiler from the generated trace signals, the compiled application code is preferably executed by the processor for a predetermined period of time, and the trace analyser is arranged to generate from the trace signals obtained during that time performance data used by the compiler code to re-compile the application code.

In embodiments where the application code to be compiled is written in a dynamically compiled language, then the compiler is preferably dynamic compiler code to be executed on the processor to dynamically compile application code during runtime.

As will be appreciated by those skilled in the art, the application code written in a dynamically compiled language is not typically all compiled prior to execution by the processor, and instead the initial application code is first interpreted, and based on the performance of the interpreted version of the code, parts of the application code may then be compiled into native code, to enable those parts to be directly executed by the processor. More particularly, in preferred embodiments, the data processing apparatus further comprises interpreter code arranged to be executed on the processor as an interpreter sequence of instructions to interpret the application code, the trace signals generated by the non-invasive trace unit being indicative of the interpreter sequence of instructions being executed by the processor, and the dynamic compiler code being arranged to compile sections of the application code dependent on the trace signals, so that those sections of the application code can be executed by the processor. The interpreter code is preferably written as native code.

In addition to the provision of interpreter code for interpreting the application code, it is also possible to provide a hardware decoder for decoding predetermined sections of the application code so that they may be directly executed on the processor. This is typically done to increase the performance of commonly used sections of the application code, for example those sections defining branches. In embodiments that include such a hardware decoder, the interpreter code is preferably arranged not to interpret those predetermined sections of the application code, and the trace signals generated by the non-invasive trace unit are further indicative of the activities of the hardware decoder. Accordingly, the information generated for use by the compiler in determining which sections of the application code should be compiled is generated dependent not only on the activities of the interpreter code, but also on the activities of the hardware decoder, thereby giving a more complete picture of how the application code is being run on the data processing apparatus.

In embodiments based upon dynamically compiled application code, then if a trace analyser is used to analyse the trace signals, that trace analyser is preferably provided by trace analyser code arranged to be executed on the processor. This trace analyser code is preferably native code.

It will be appreciated by those skilled in the art that the present invention could be applied to any dynamically compiled language. However, in preferred embodiments the application code comprises JAVA™ bytecodes which can be dynamically compiled.

In such embodiments, the dynamic compiler code is preferably provided within a JAVA VIRTUAL MACHINE™ arranged to be executed on the processor. In addition, the interpreter code is preferably provided within the JAVA VIRTUAL MACHINE™. Additionally, in preferred embodiments, the trace analyser code is also provided within the JAVA VIRTUAL MACHINE™. As will be appreciated by those skilled in the art, a Virtual Machine is a simulated computer that runs on a host computer but behaves as if it is a separate computer. The JAVA VIRTUAL MACHINE™ hence works as a self-contained operating environment to run JAVA™ applications, which are then run independently from the host operating system.

Typically, a compiler is arranged to convert source code into object code. Accordingly, in such embodiments, the application code is source code, and the compiler is arranged to generate said instructions in object code format dependent on the trace signals. However, in an alternative embodiment, the application code is object code, and the compiler is arranged to generate said instructions as new object code dependent on the trace signals. The new object code has the same behaviour as the previous object code, but has enhanced performance as a result of being created having regard to the trace signals. In such embodiments, the compiler is often referred to as an optimiser, or a binary translator.

Viewed from a second aspect, the present invention provides a method of compiling application code within a data processing apparatus comprising a processor for executing instructions, and a non-invasive trace unit coupled to the processor for generating, from input signals received from the processor, trace signals indicative of the instructions being executed by the processor, the method comprising the steps of: a) compiling application code to generate instructions for execution by the processor; b) employing the non-invasive trace unit to generate said trace signals; and c) controlling the compilation of the application code at said step (a) dependent on the trace signals.

Viewed from a third aspect, the present invention provides a computer program product operable to configure a data processing apparatus to perform the method in accordance with the second aspect of the present invention.

Viewed from a fourth aspect, the present invention provides a computer program product operable to configure a data processing apparatus to perform the compilation steps a) and c) of the method in accordance with the second aspect of the present invention.

Viewed from a fifth aspect, the present invention provides a computer program product in accordance with the fourth aspect of the present invention, further operable to configure a data processing apparatus to perform the step of deriving from the trace signals performance data for use in controlling the compilation of the application code.

Viewed from a sixth aspect, the present invention provides a computer program product operable to configure a data processing apparatus to perform the step of deriving from the trace signals performance data for use in controlling the compilation of the application code.

Viewed from a seventh aspect, the present invention provides a computer readable medium comprising a computer program in accordance with any of the third to sixth aspects of the present invention.

BRIEF DESCRIPTION OF THE DRAWINGS

The present invention will be described, further by way of example only, with reference to preferred embodiments thereof as illustrated in the accompanying drawings, in which.

DESCRIPTION OF PREFERRED EMBODIMENTS

Figure 1:
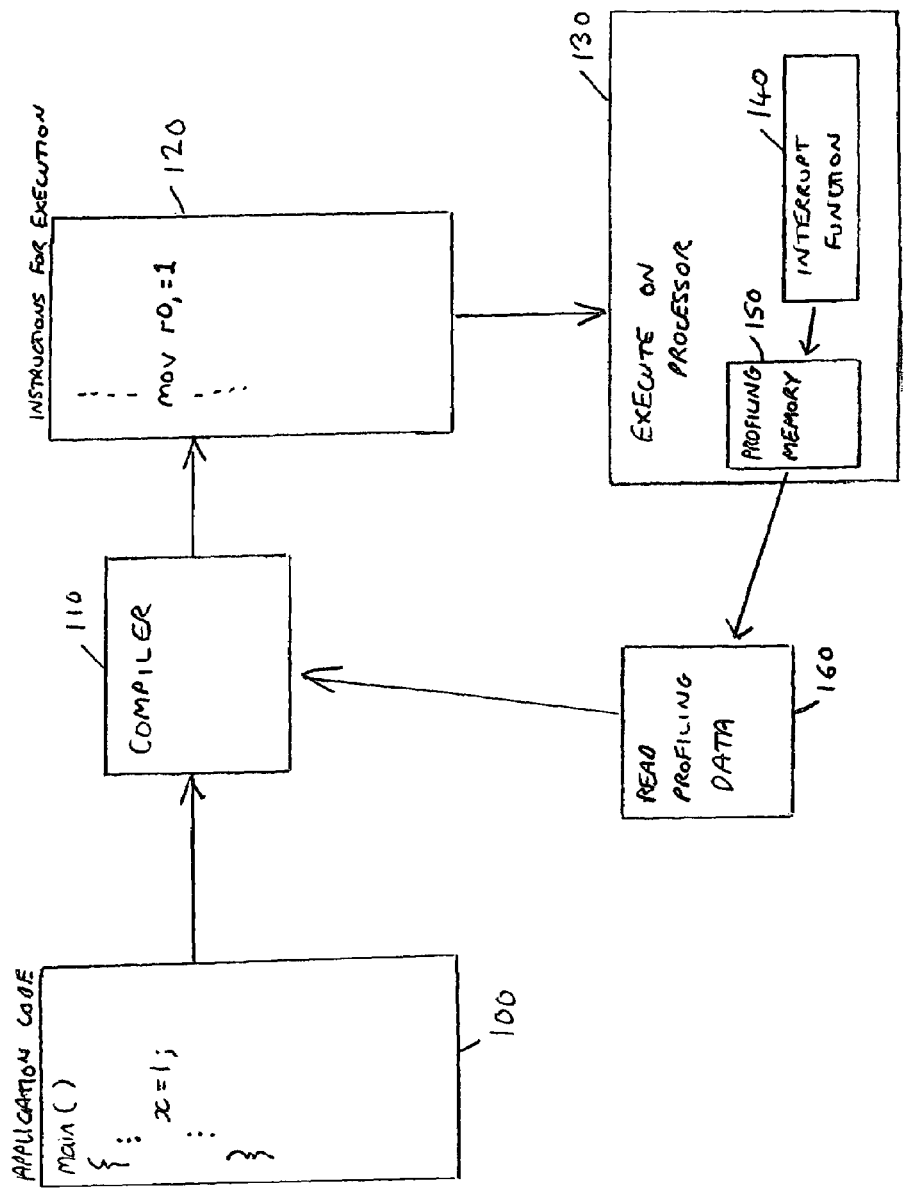
FIG. 1 is a diagram schematically illustrating a prior art sample based profiling technique for generating profiling information.

FIG. 1 is a diagram schematically illustrating a sample based profiling technique for generating profiling information for use in FDO of code generated by a compiler. As shown in FIG. 1, the application code 100 is passed through a compiler 110 in order to generate a sequence of instructions 120 for execution. The compiler 110 will typically be formed as software to be executed on a processor, which may or may not be the same processor as is intended to execute the sequence of instructions 120. As shown in FIG. 1 by way of example, if part of the application code specifies that a parameter, in this example parameter "x" is to be set equal to 1, then this may result in the compiler 110 generating an instruction to set the value of a particular register to 1. Within the ARM instruction set developed by ARM Limited of Cambridge, England, this would typically be done by way of a "MOV" instruction, which is arranged to move a specified value into a register, in the example illustrated in FIG. 1 this instruction being arranged to move the value 1 into the register r0.

As is well known by those skilled in the art, there are typically a number of different ways in which the compiler 110 may choose to actually convert particular sections of application code into instruction sequences. One importance piece of information that enables the compiler 110 to determine how best to compile any particular portion of the application code is the execution behaviour of the application when run on the processor. Such execution behaviour will include a variety of different pieces of information, for example how many times a particular loop iterates, is a "then" clause likely to be executed, how long a function takes to execute, etc. As mentioned earlier, FDO is a mechanism for obtaining information about the runtime behaviour of a program for use by the compiler. The executing program is profiled, and the profiling information obtained is used by the compiler to recompile the application code, for example to make frequently executed paths through the code faster and other paths slower. There are many different known optimisation techniques, for example those discussed in the article "Feedback directed optimisation in Compaq's compilation tools for Alpha" by Robert Cohn et al, which appeared in the $2^{nd}$ ACM Workshop on Feedback-Directed Optimisation, Haifa, Israel, Nov. 15, 1999. However, prior to being able to apply any such optimisation techniques, it is clearly important to get accurate profiling information for input into the compiler 110.

One known technique for obtaining such profiling information is the so-called sample based profiling technique, which is illustrated in FIG. 1. In accordance with this technique, the instructions for execution 120 are executed on the intended processor (also referred to herein as the "target" processor), as indicated by box 130 in FIG. 1. At various points during execution, an interrupt function 140 is used to stall execution of the processor at predetermined points to enable performance counters to be read, for example via a JTAG interface, or to be saved into memory, these performance counters being stored as profiling data within the profiling memory 150. As will be appreciated by those skilled in the art, this profiling memory 150 can take a variety of forms, for example on-chip or external RAM accessible by the processor.

As indicated by box 160 in FIG. 1, the profiling data can then be read, for example via a "profiling" handler, which is then arranged to feed such profiling information back into the compiler 110 to control the compilation of the application code. As mentioned earlier, one problem with this approach is that it adversely affects the accuracy of the profiling data obtained, since the execution of the instructions must be interrupted at predetermined points in order to obtain the profiling information, and accordingly the instructions are not executing in their intended manner.

Figure 2:
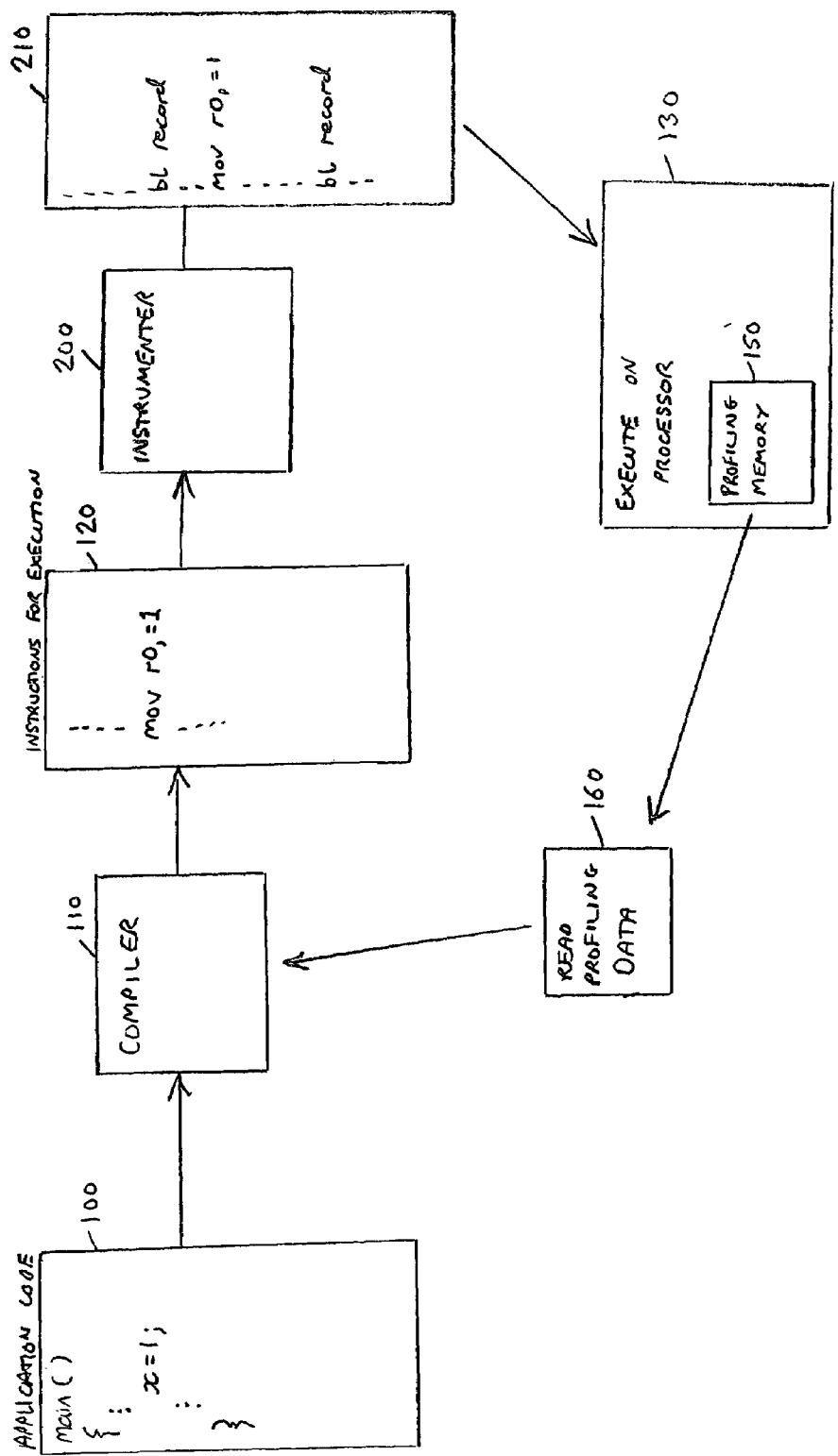
FIG. 2 is a diagram schematically illustrating a prior art "instrumentation" technique for generating profiling information.

FIG. 2 describes an alternative prior art technique for obtaining the profiling information required for FDO techniques. As with the technique described in FIG. 1, the application code 100 is passed through a compiler 110 in order to generate a sequence of instructions for execution 120. Then, prior to execution of those instructions on the processor, the instructions are first passed through an instrumenter 200, which is arranged to insert into the instruction sequence additional instructions that will cause profiling information to be recorded in the profiling memory when those instructions are executed. This results in a modified instruction sequence 210.

As shown in FIG. 2, one type of instruction that may be added by the instrumenter 200 is a branch instruction that when executed causes the instruction flow to branch to a predetermined routine used to store certain profiling information into the profiling memory 150. In the example illustrated in FIG. 2, the branch instruction is referred to as a "bl" instruction, and identifies a routine called "record", that is arranged to record the necessary profiling information into the profiling memory 150.

It should be noted that whilst the instrumentation process is illustrated in FIG. 2 as a separate process to the compilation process, these processes often occur in parallel, and indeed the instrumentation software is some times incorporated within the compiler software. As instrumentation is a well known technique in the art, it will not be discussed in any further detail herein.

Once the instrumentation process has taken place, the modified instruction sequence 210 is executed on the processor, as indicated by box 130, and results in certain profiling information being stored in the profiling memory 150. As described earlier with reference to FIG. 1, this profiling information can then be read at an appropriate time, and fed back to the compiler 110 for use in controlling the compilation of the application code. As mentioned earlier, such instrumentation techniques can significantly alter the behaviour of the code when executed on the processor, due to the presence of the additional instructions, and accordingly this adversely affects the accuracy of the profiling information obtained. Additionally, the presence of the additional instructions slows down the execution of the code, which again adversely affects the accuracy of the information collected. Further, in realtime systems, such as the dynamic compilation performed on dynamically compiled languages, this results in a performance cost due to the collecting of the profiling information, which can somewhat negate the performance benefits to be realised by the dynamic compilation process based on the profiling information.

Figure 3:
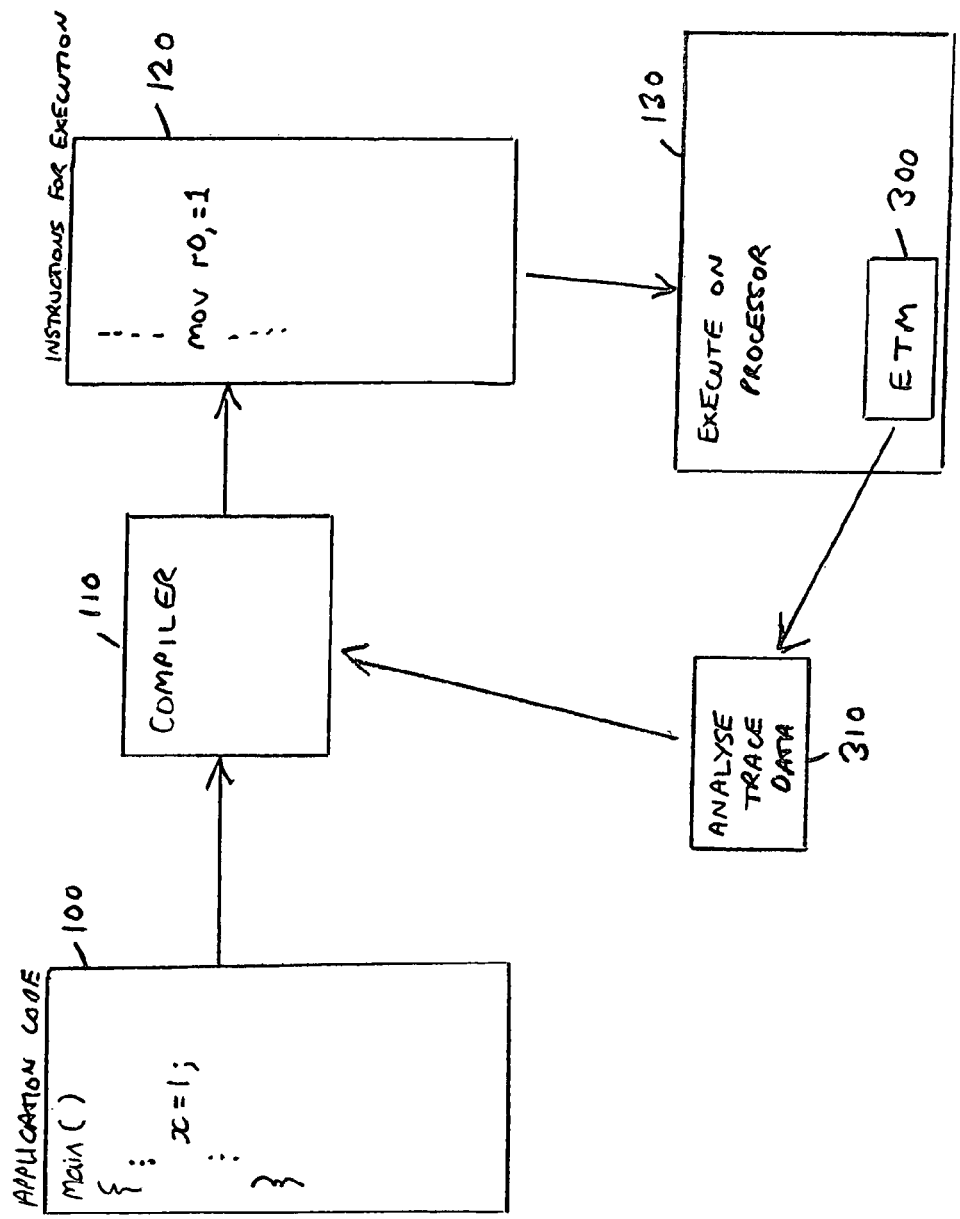
FIG. 3 is a diagram schematically illustrating how profiling information is obtained in accordance with embodiments of the present invention.

To alleviate these problems, preferred embodiment of the present invention use a technique such as that described schematically in FIG. 3. As before, the application code 100 is passed through a compiler 110 in order to generate instructions for execution 120. This instruction sequence is then executed on the processor 130, but instead of using any of the earlier described invasive techniques for obtaining the profiling information, an Embedded Trace Macrocell (ETM) 300 is arranged to generate trace signals indicative of the instructions being executed by the processor.

ETMs are typically used in system development to generate trace streams including data representing the step-by-step activity within the system being traced. Due to the increased difficulty in tracking the state of the processor via externally accessible pins, increased amounts of tracing functionality are being placed on-chip, examples of such on-chip tracing mechanisms being the ETM provided by ARM Limited, Cambridge, England in association with various ARM processors.

The ETM is arranged to produce in realtime a trace stream of data representing activities of the data processing system that are desired to be traced. This trace stream can then subsequently be used to facilitate debugging of sequences of processing instructions being executed by the data processing system. This trace stream is generated in a totally non-invasive manner, and hence has no effect on the behaviour of the code being executed by the processor. The inventors of the present invention realised that by appropriate specification of the behaviour to be traced by the ETM 300, the trace signals generated could be used to generate profiling information that could be fed back to the compiler 110 for use in FDO techniques. This is an entirely new use of the ETM 300, not previously contemplated. By using the ETM 300, data can be obtained without affecting the execution behaviour or performance of the code being executed on the processor, and from this data appropriate profiling information can be obtained for feeding back to the compiler 110. Hence, as shown in FIG. 3, the trace stream generated by the ETM 300 can subsequently be analysed, as indicated by block 310, in order to generate appropriate profiling information for feeding back to the compiler 110 for use in controlling the compilation of the application code.

In one embodiment, the profiling information is input directly into the compiler 110 as indicated in FIG. 3, for use by the compiler in controlling the compilation of the application code. However, in an alternative embodiment, a pre-processor may be provided which is operable to receive the profiling information and to modify the application code 100 to be compiled by the compiler 110. Thus the compiler then receives a modified version of the application code for compilation which has already taken into account the profiling information derived from the trace signals.

Figure 4:
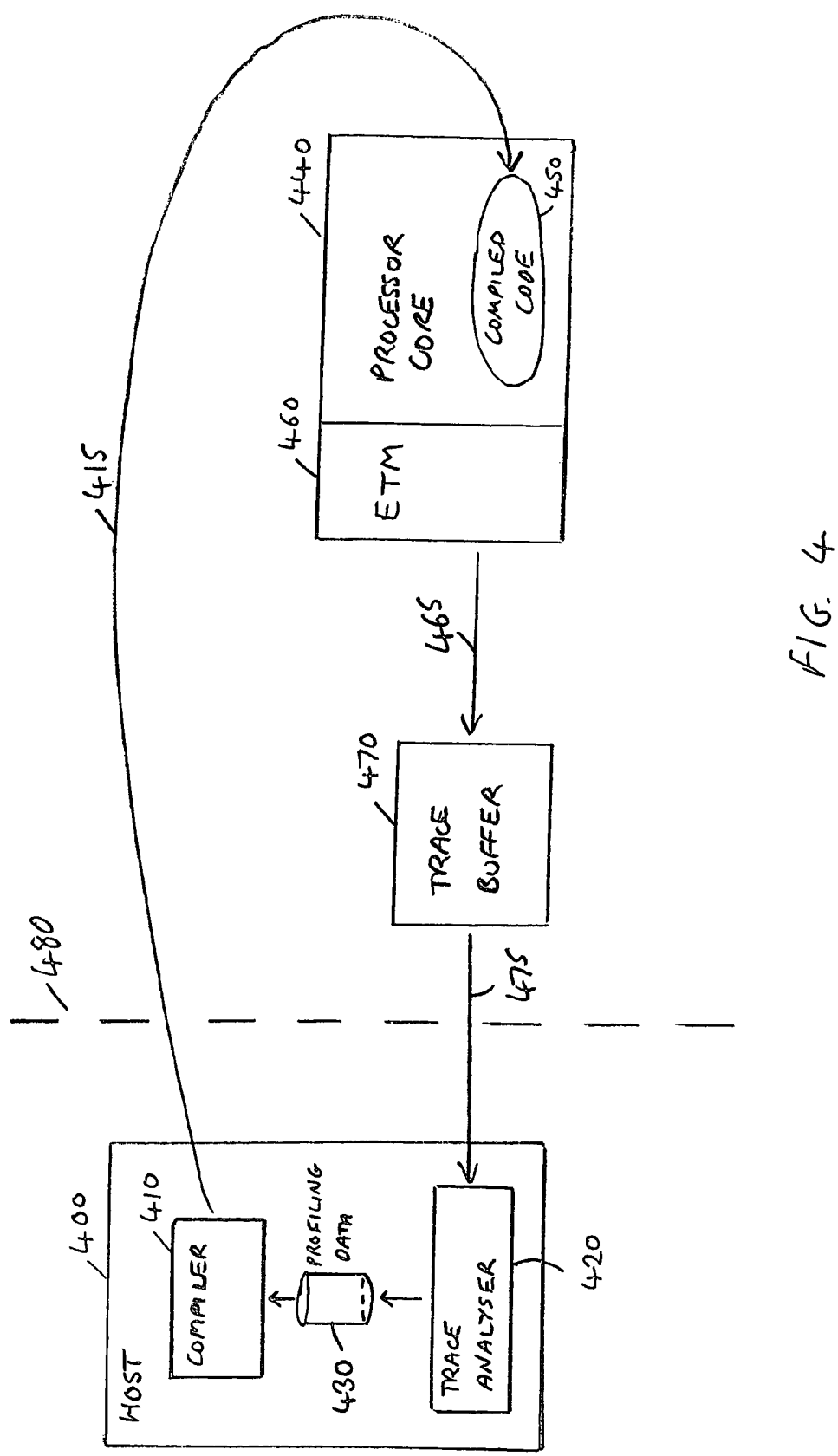
FIG. 4 is diagram schematically illustrating the generation of profiling information for use in optimising the compilation of statically compiled languages in accordance with one embodiment of the present invention.

FIG. 4 is a block diagram illustrating in more detail the generation of the profiling data in an embodiment where the application code is written using a statically compiled language, such as C or C++. In such an embodiment, it is envisaged that the compiler code 410 is executed on a processor of host system 400 different to the processor core 440 on which the compiled application code is intended to execute. The application code is first compiled by the compiler 410 without access to any profiling data, and this compiled code is passed over path 415 to the processor core 440 within a target system, where it will be stored within a portion of memory accessible by the processor core 440. This is illustrated stigmatically in FIG. 4 as compiled code 450.

The compiled code 450 is then executed on the processor core 440, which results in the ETM 460 generating a trace stream over path 465 for storage within the trace buffer 470. This trace buffer could be either a separate piece of hardware or alternatively can be provided by a block of memory within the target system. As would be appreciated by those skilled in the art, the trace stream may comprise of a number of pieces of information, but at a minimum will identify branches in instruction flow which will then enable a picture of the instruction flow within the processor core to later be derived by the trace analyser 420 within the host 400.

It is envisaged that the application code would be executed for a pre-determined period of time in a test mode, after which the trace analyser 420 is arranged to retrieve from the trace buffer 470 over path 475 the stream of trace signals generated by the ETM 460. The trace analyser 420 is then arranged to determine from the trace signals the behaviour of the processor core, for example to build up a picture of the instruction flow within the processor core, and from that behaviour to then generate profiling data 430 for feeding back into the compiler 410.

Trace analysers have already been developed for performing analysis on the trace streams generated by ETMs, although as discussed previously, such analysis was used as part of debugging processes performed upon data processing systems. It is envisaged that any such known trace analysers could be used as the trace analyser 420, and that such trace analysers could then be controlled to produce appropriate profiling data 430 that could be used by the compiler 410. For example, the trace analyser could be provided by ARM Limited's Trace Debug Tools (TDT) software product.

It will be appreciated by those skilled in the art that the profiling data can take a variety of forms, dependent on the data required by the FDO techniques to be applied by the compiler 410. However, in preferred embodiments the profiling data is performance data identifying frequency of execution of sequences of instructions and/or data identifying the time that particular sequences of instructions have taken to execute. Hence, if a particular sequence of instructions appears to be being executed frequently, and currently has a relatively slow execution time, the compiler 410 may be able to compile that sequence of instructions differently with the aim of reducing the execution time for that sequence of instructions.

Accordingly, based on the profiling data 430, the compiler 410 is arranged to re-compile the application code having regard to that profiling data, and to then output over path 415 the revised compiled code to the processor core 440. It is then this revised compiled code that will be used from then on by the processor core 440. At this point, the data processing system incorporating the processor core 440 can be de-coupled from the host system 400, as indicated by the dotted line 480.

Hence, as can be seen from the above description, an ETM 460 attached to a processor core 440, for example an ARM processor core, can provide an historical record of the execution of the processor with zero intrusion.

Figure 5:
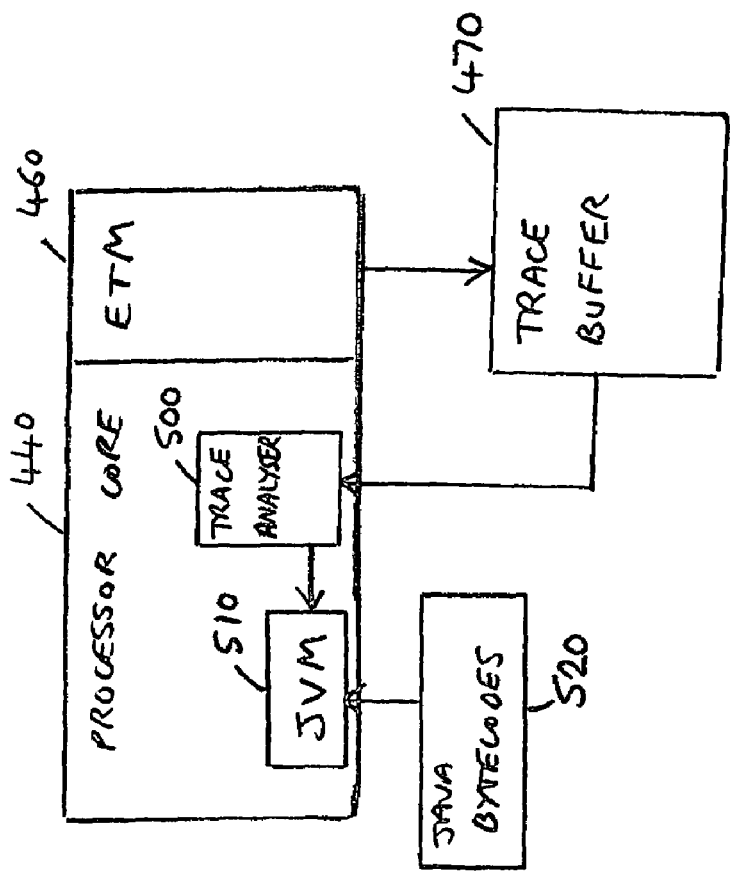
FIG. 5 is a diagram schematically illustrating the generation of profiling information for use in dynamic compilation of JAVA™ bytecodes in accordance with a further embodiment of the present invention.

An alternative embodiment of the present invention is illustrated in FIG. 5, where the techniques of the preferred embodiment are used to generate profiling information for use in dynamic compilation of application code formed of JAVA™ bytecodes. As will be appreciated by those skilled in the art, a JAVA VIRTUAL MACHINE™ 510 is provided for execution on the processor core 440 to act as a self-contained operating environment for running JAVA™ applications formed of JAVA™ bytecodes 520. This configuration has the advantage that the JAVA™ application can be run independently from the host operating system provided within the processor core 440. As parts of the JAVA VIRTUAL MACHINE™ are run on the processor core to, in effect, run the JAVA™ bytecodes 520, this results in the ETM 460 generating a stream of trace signals for storage within the trace buffer 470. In accordance with preferred embodiments of the present invention, trace analyser code 500 is provided for running on the processor core 440 to analyse the trace stream generated by the ETM 460, in order to generate profiling information for feeding back into the JAVA VIRTUAL MACHINE™ 510, this information then being used to control the dynamic compilation of sections of JAVA™ bytecodes. This process is illustrated in more detail with reference to FIG. 6.

Figure 6:
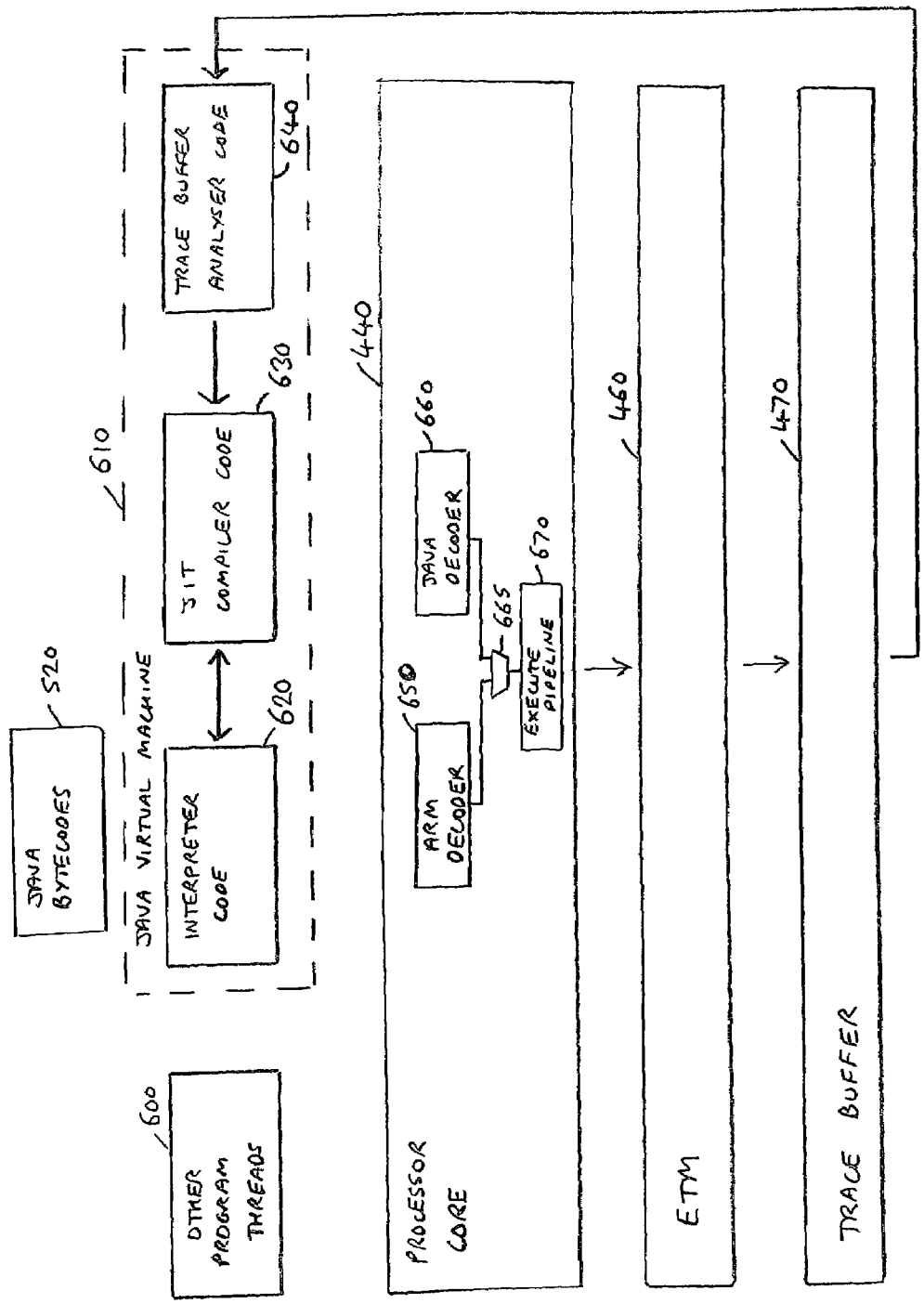
FIG. 6 is a diagram illustrating in more detail how trace data is used to control the dynamic compilation of JAVA™ bytecodes in accordance with a preferred embodiment of the present invention.

As shown in FIG. 6, the processor core 440, for example an ARM processor core, is arranged to execute a number of different applications 600, 610. Preferably, a multi-tasking operating system is run on the processor core to allow portions of processing time to be allocated to each of the various program threads being executed at a particular point in time. The JAVA VIRTUAL MACHINE™ 610 consists of a number of different program threads that need to be executed on the processor core, these including interpreter code 620, Just In Time (JIT) compiler code 630 and trace buffer analyser code 640. Each of these program threads will consist of native code for execution on the processor core 440, and hence as an example, if the processor core is an ARM processor, these program threads will consist of ARM code.

The interpreter code 620 and the JIT compiler code 630 are standard features of a JAVA VIRTUAL MACHINE™ 610, whilst the trace buffer analyser code 640 is code that has been added in accordance with preferred embodiments of the present invention to analyse the trace stream generated by the ETM 460, as will be discussed in more detail later. As is clear from the earlier FIG. 5, there is no requirement for the trace buffer analyser code to be contained with the JAVA VIRTUAL MACHINE™, and indeed it could be provided as an entirely separate piece of code.

The interpreter code 620 is arranged to be executed on the processor core 440 as an interpreter sequence of instructions used to interpret the JAVA™ bytecodes 520. As will be appreciated by those skilled in the art, the interpreter code 620 identifies for each possible JAVA™ bytecode the actions that need to be performed. Hence, as an example, the interpreter code 620 will specify that if the JAVA™ bytecode is an "add" bytecode, the required operation is to add together the data values in the top of stack and top of stack −1 entries of the stack, with the result then being contained in the top of stack entry. The interpreter code 620 will be passed through the ARM decoder 650 and then routed via the multiplexer 665 through the execute pipeline 670 in order to perform that interpretation, and cause the appropriate action to be taken. The ETM 460 will generate trace signals indicative of the activity of the processor core 440, which will then be stored within the trace buffer 470.

The trace analyser code 640 is then arranged to retrieve the contents of the trace buffer, and from the trace signals generate profiling information for inputting into the JIT compiler code 630. The JIT compiler code 630 will use that profiling information to determine which sections, if any, of the JAVA™ bytecodes 520 should be compiled into ARM code for direct execution on the processor core 440. Hence, as an example, the JAVA™ bytecodes of the most often executed sections of the JAVA™ application will be compiled by the JIT compiler code 630 into native code (in this example ARM code) for direct execution by the processor.

Once a particular section of the JAVA™ bytecodes has been compiled, then when that section is subsequently encountered, it no longer needs to be interpreted by the interpreter code 620 but instead can be routed directly through the ARM decoder 650 and the execute pipeline 670, thus significantly increasing the performance of that section of the JAVA™ application.

Whilst these various program threads 620, 630, 640 are being executed on the processor core 440, it will be apparent that other program threads 600 could also be executed.

In preferred embodiments, the processor core 440 is additionally provided with a JAVA™ hardware decoder 660 for accelerating execution of particular JAVA™ bytecode sequences. The JAVA™ decoder 660 is arranged to decode certain JAVA™ bytecodes in order to directly specify a number of operations to be performed by the execute pipeline 670 without the requirement to convert those bytecodes into native code. The JAVA™ hardware decoder 660 will typically be arranged to perform such an operation on commonly occurring JAVA™ bytecodes, such as those specifying branches. Accordingly, in order that the trace buffer analyser code 640 can build up an accurate picture of how the JAVA™ bytecodes are being run on the processor core 440, the ETM 460 is arranged not only to trace signals relating to the execution of the interpreter code on the processor core 440, but also to generate trace signals indicative of the activities of the JAVA™ decoder 660. Based on this information, appropriate profiling information can be generated for the JIT compiler code 630, to enable the JIT compiler code to determine which bytecodes to compile to native code.

In preferred embodiments, the ETM 460 will be arranged to generate trace signals capturing the target addresses of all taken BXJ instructions (i.e. ARM instructions that Branch to the JAVA™ decoder 660), and also to trace the target addresses of bytecodes "goto", "if" and "jsr" (i.e. jump to sub-routine) instructions. The trace buffer analyser code 640 is preferably arranged to use a coprocessor interface to manipulate the trace hardware, and obtain memory mapped access to the trace buffer via the processor bus in order to read the trace buffer. The trace buffer analyser code can then be arranged to perform a number of functions in order to generate appropriate signals for the JIT compiler code 630. For example, the trace buffer analyser code 640 could be arranged to keep usage counters, possibly using a hash of the target address of the branches into JAVA™ code, and upon discovering an address that is being frequently executed, may be arranged to cause the JAVA VIRTUAL MACHINE™'s JIT compiler to translate the bytecode sequence into a more optimal ARM machine code form.

It will be appreciated by those skilled in the art that the use of the ETM 460 in the manner described in FIG. 6 may impact on its ability to be used for its initially envisaged debugging process. However, this problem can be alleviated by using extensions to the ETM hardware to implement a separate, co-existing, profiler macrocell, for example using a dual ported interface to a hash mapped block of usage counters.

Figure 7:
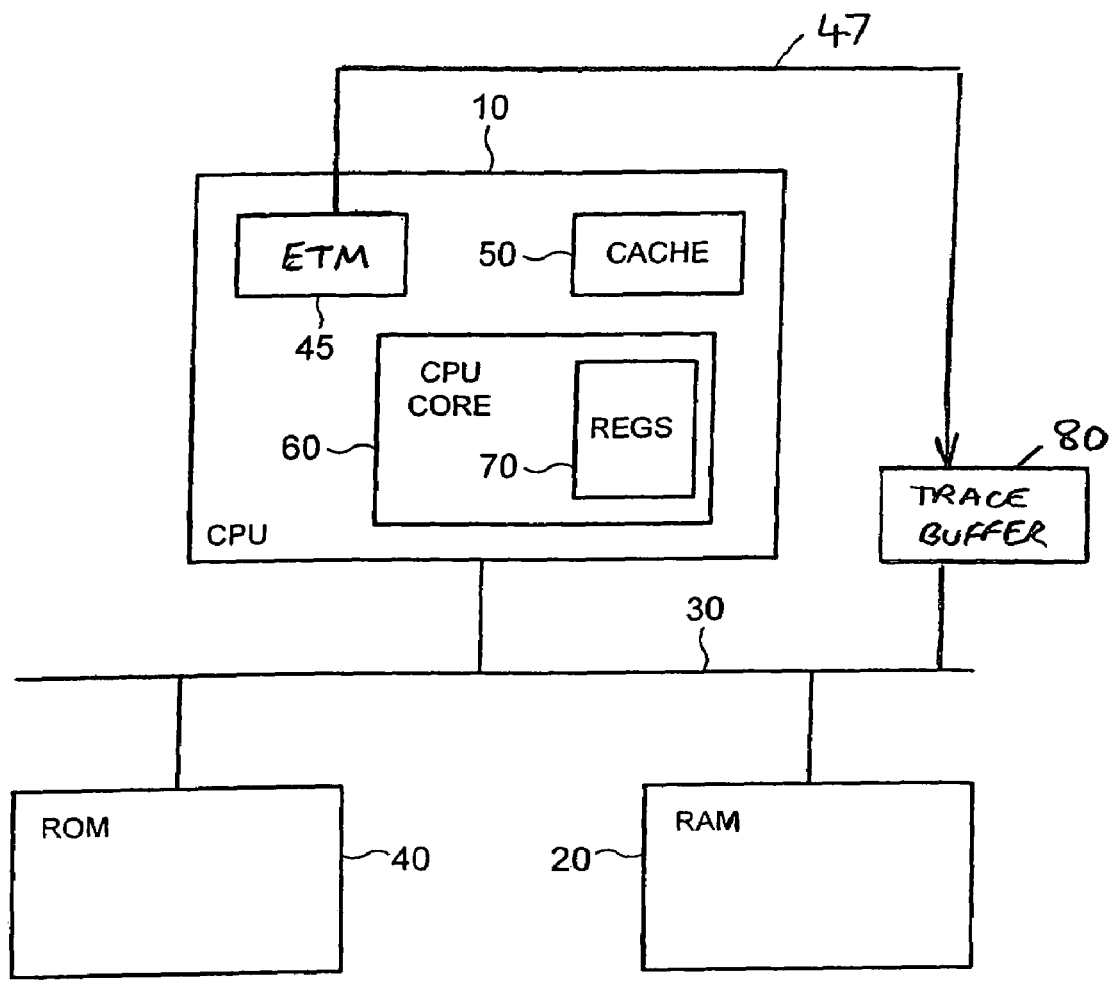
FIG. 7 is a block diagram schematically illustrating a data processing apparatus in which embodiments of the present invention may be employed.

FIG. 7 is a block diagram schematically illustrating a data processing apparatus in which the preferred embodiment of the present invention may be employed. In preferred embodiments, the data processing apparatus takes the form of a CPU core 60 provided within a CPU 10. The CPU core 60 will incorporate a processing unit for executing instructions and a set of registers 70 accessible by that processing unit for containing data values to be manipulated by the processing unit. The CPU 10 will typically include the CPU core 60, the ETM 45 and a number of other elements, such as a cache 50.

CPU 10 will typically be connected to other elements via a bus 30, and hence for example may be connected to a Read Only Memory ("ROM") 40 and a Random Access Memory ("RAM") 20. The ROM 40 may be used to store, amongst other things, the operating system to be run on the CPU core 60, whilst in accordance with preferred embodiments of the present invention, the RAM 20 may be used to store application code and/or the compiled form of that code for execution on the CPU core 60. A trace buffer 80 may also be coupled to the bus 30, for use in storing the trace stream generated by the ETM 45. The trace stream from the ETM 45 is routed over path 47 to the trace buffer 80.

Having regard to the earlier described embodiment involving statically compiled languages, it is envisaged that the host system 400 would be coupled to the data processing apparatus illustrated in FIG. 7, to enable the compiled code generated by the compiler 410 to be loaded into the RAM 20 for execution by the CPU core 60 during the test mode. The trace analyser 420 would then be arranged to interface with the data processing apparatus illustrated in FIG. 7 to retrieve the trace streams stored within the trace buffer 80 (which may be provided within the target system as illustrated in FIG. 7, or externally to it as discussed previously), to enable the compiler 410 to then recompile the code having regard to the profiling data 430 generated by the trace analyser 420. This re-compiled code would then be stored within the RAM 20, for subsequent execution by the CPU core 60. At this point, the host system 400 would be de-coupled from the data processing apparatus illustrated in FIG. 7.

Having regard to the other embodiments described herein relating to dynamically compiled languages, and in particular the dynamic compilation of JAVA™ bytecodes, it is envisaged that the JAVA VIRTUAL MACHINE™ 610, the trace analyser (if not contained within the JAVA VIRTUAL MACHINE™), the other program threads 600 and the JAVA™ bytecodes 520 would all be stored within the RAM 20 for execution on the CPU core 60. In this embodiment, the trace buffer 80 needs to be accessible from the CPU core 60.

From the above description, it will be apparent that in accordance with preferred embodiments of the present invention, a non-invasive trace unit, such as the ETM developed by ARM Limited, is used to provide a detailed trace of the behaviour, and hence the performance, of part or all of the code of a data processing system. This approach has no impact on the performance of the system, and accordingly by using the ETM as the source of the profiling information for FDO of the compilation, the earlier described problems of prior art FDO techniques are substantially alleviated. Furthermore, since the technique is non-invasive, the information collected is accurate, and collecting the information does not slow the system down.

When a statically compiled language is being used, the trace data can be collected and analysed by a separate computer using the standard trace interfaces. This has no impact whatsoever on the behaviour or performance of the target processor, and the collected information is then fed into the compiler in the same way as in classical FDO techniques.

For dynamically compiled languages such as JAVA™, the trace data is stored in a trace buffer, and then read and analysed in a separate thread of the JAVA VIRTUAL MACHINE™. The result of this analysis can then be fed back into the JAVA™ bytecode compiler to decide what parts of the software should be compiled to native code. Whilst this will have some effect on the performance of the system, due to the presence of the extra program thread, this should be far less than the adverse effect resulting from collecting the same amount of information using the known prior art techniques, for example instrumentation. Furthermore, because this overhead does not specifically occur when the application code being analysed is run, it does not distort the performance data collected.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, said apparatus comprising:
   a processor for executing instructions, said processor providing input signals;
   a non-invasive trace unit for generating, from said input signals received from the processor, trace signals indicative of the instructions being executed by the processor; and
   a compiler for compiling application code to generate said instructions for execution by the processor; the compiler controlling the compilation of the application code in dependence on the trace signals.

2. A data processing apparatus as claimed in claim 1, wherein the non-invasive trace unit and the processor are provided on the same chip.

3. A data processing apparatus as claimed in claim 2, wherein the non-invasive trace unit is an embedded trace macrocell.

4. A data processing apparatus as claimed in claim 1, further comprising:
   a trace analyser for deriving from the trace signals performance data for use in controlling the compilation of the application code by the compiler.

5. A data processing apparatus as claimed in claim 4, wherein the performance data is input directly into the compiler.

6. A data processing apparatus as claimed in claim 4, further comprising a pre-processor operable to receive the performance data and to modify the application code to be compiled by the compiler.

7. A data processing apparatus as claimed in claim 4, wherein the performance data comprises data identifying frequency of execution of sequences of instructions.

8. A data processing apparatus as claimed in claim 4, wherein the performance data comprises data identifying execution time of sequences of instructions.

9. A data processing apparatus as claimed in claim 1, wherein the trace signals identify branches in instruction flow.

10. A data processing apparatus as claimed in claim 1, further comprising:
    a trace buffer for storing the trace signals for subsequent analysis prior to feedback to the compiler.

11. A data processing apparatus as claimed in claim 1, wherein the processor is a target processor and the compiler is compiler code to be executed on a host processor different to the target processor.

12. A data processing apparatus as claimed in claim 11, wherein the application code as compiled by the compiler code is executed in test mode on the target processor, and the compiler code is arranged to re-compile the application code dependent on the trace signals generated by the non-invasive trace unit.

13. A data processing apparatus as claimed in claim 12, further comprising a trace analyser for deriving from the trace signals performance data for use in controlling the compilation of the application code by the compiler, and wherein the compiled application code is executed by the processor for a predetermined period of time, and the trace analyser is arranged to generate from the trace signals obtained during that time performance data used by the compiler code to re-compile the application code.

14. A data processing apparatus as claimed in claim 1, wherein the compiler is dynamic compiler code to be executed on the processor to dynamically compile application code during runtime.

15. A data processing apparatus as claimed in claim 14, further comprising interpreter code arranged to be executed on the processor as an interpreter sequence of instructions to interpret the application code, the trace signals generated by the non-invasive trace unit being indicative of the interpreter sequence of instructions being executed by the processor, and the dynamic compiler code being arranged to compile sections of the application code dependent on the trace signals, so that those sections of the application code can be executed by the processor.

16. A data processing apparatus as claimed in claim 15, further comprising a hardware decoder for decoding predetermined sections of the application code for execution on the processor, the interpreter code being arranged not to interpret those predetermined sections of the application code, and the trace signals generated by the non-invasive trace unit further being indicative of the activities of the hardware decoder.

17. A data processing apparatus as claimed in claim 14, further comprising a trace analyser for deriving from the trace signals performance data for use in controlling the compilation of the application code by the compiler, and wherein the trace analyser is trace analyser code for execution on the processor.

18. A data processing apparatus as claimed in claim 14, wherein the application code comprises virtual machine bytecodes.

19. A data processing apparatus as claimed in claim 18, wherein the dynamic compiler code is provided within a virtual machine arranged to be executed on the processor.

20. A data processing apparatus as claimed in claim 19, further comprising interpreter code arranged to be executed on the processor as an interpreter sequence of instructions to interpret the application code, the trace signals generated by the non-invasive trace unit being indicative of the interpreter sequence of instructions being executed by the processor, and the dynamic compiler code being arranged to compile sections of the application code dependent on the trace signals, so that those sections of the application code can be executed by the processor, wherein the interpreter code is provided within the virtual machine.

21. A data processing apparatus as claimed in claim 19, further comprising a trace analyser for deriving from the trace signals performance data for use in controlling the compilation of the application code by the compiler, wherein the trace analyser is trace analyser code for execution on the processor, and wherein the trace analyser code is provided within the virtual machine.

22. A data processing apparatus as claimed in claim 1, wherein the application code is source code, and the compiler is arranged to generate said instructions in object code format dependent on the trace signals.

23. A data processing apparatus as claimed in claim 1, wherein the application code is object code, and the compiler is arranged to generate said instructions as new object code dependent on the trace signals.

24. A method of compiling application code within a data processing apparatus comprising a processor for executing instructions, and a non-invasive trace unit coupled to the processor for generating, from input signals received from the processor, trace signals indicative of the instructions being executed by the processor, the method comprising the steps of:
a) compiling application code to generate instructions for execution by the processor;
b) employing the non-invasive trace unit to generate said trace signals; and
c) controlling the compilation of the application code at said step (a) dependent on the trace signals.

25. A method as claimed in claim 24, wherein the non-invasive trace unit and the processor are provided on the same chip.

26. A method as claimed in claim 25, wherein the non-invasive trace unit is an embedded trace macrocell.

27. A method as claimed in claim 24, further comprising the step of:

(d) deriving from the trace signals performance data for use in controlling the compilation of the application code at said step (c).

28. A method as claimed in claim 27, wherein the performance data comprises data identifying frequency of execution of sequences of instructions.

29. A method as claimed in claim 27, wherein the performance data comprises data identifying execution time of sequences of instructions.

30. A computer program product operable to comprising a computer readable medium containing computer readable instructions for controlling a data processing apparatus to perform said step (d) of the method as claimed in claim 27.

31. A computer readable medium comprising a computer program as claimed in claim 30.

32. A method as claimed in claim 24, wherein the trace signals identify branches in instruction flow.

33. A method as claimed in claim 24, further comprising the step of:
storing the trace signals in a trace buffer for subsequent analysis prior to feedback to said step (c).

34. A method as claimed in claim 24, wherein the processor is a target processor and said compiling of the application code is performed by compiler code executed on a host processor different to the target processor.

35. A method as claimed in claim 34, further comprising the steps of:
executing in test mode the application code as compiled by the compiler code at said step (a); and
at said step (c), re-compiling the application code dependent on the trace signals generated by the non-invasive trace unit.

36. A method as claimed in claim 35, further comprising the step (d) of deriving from the trace signals performance data for use in controlling the compilation of the application code at said step (c), wherein the application code compiled at said step (a) is executed by the processor for a predetermined period of time, and said step (d) comprises the step of generating from the trace signals obtained during that time performance data used to re-compile the application code at said step (c).

37. A method as claimed in claim 24, wherein said compiling of the application code is performed by dynamic compiler code executed on the processor to dynamically compile application code during runtime.

38. A method as claimed in claim 37, further comprising the steps of:
executing interpreter code on the processor as an interpreter sequence of instructions to interpret the application code, the trace signals generated by the non-invasive trace unit being indicative of the interpreter sequence of instructions being executed by the processor; and
at said step (c), employing the dynamic compiler code to compile sections of the application code dependent on the trace signals, so that those sections of the application code can be executed by the processor.

39. A method as claimed in claim 38, further comprising the step of:
employing a hardware decoder to decode predetermined sections of the application code for execution on the processor, the interpreter code being arranged not to interpret those predetermined sections of the application code, and the trace signals generated by the non-invasive trace unit further being indicative of the activities of the hardware decoder.

40. A method as claimed in claim 37, further comprising the step (d) of deriving from the trace signals performance data for use in controlling the compilation of the application code at said step (c), wherein said step (d) is performed by trace analyser code executing on the processor.

41. A method as claimed in claim 35, wherein the application code comprises virtual machine bytecodes.

42. A method as claimed in claim 41, wherein the dynamic compiler code is provided within a virtual machine arranged to be executed on the processor.

43. A data processing apparatus as claimed in claim 42, further comprising the steps of:
  executing interpreter code on the processor as an interpreter sequence of instructions to interpret the application code, the trace signals generated by the non-invasive trace unit being indicative of the interpreter sequence of instructions being executed by the processor; and
  at said step (c), employing the dynamic compiler code to compile sections of the application code dependent on the trace signals, so that those sections of the application code can be executed by the processor;
  wherein the interpreter code is provided within the virtual machine.

44. A method as claimed in claim 42, further comprising the step (d) of deriving from the trace signals performance data for use in controlling the compilation of the application code at said step (c), wherein said step (d) is performed by trace analyser code executing on the processor, and wherein the trace analyser code is provided within the virtual machine.

45. A computer program product operable to comprising a computer readable medium containing computer readable instructions for controlling a data processing apparatus to perform the method as claimed in claim 24.

46. A computer readable medium comprising a computer program as claimed in claim 45.

47. A computer program product operable comprising a computer readable medium containing computer readable instructions for controlling a data processing apparatus to perform said steps (a) and (c) of the method as claimed in claim 24.

48. A computer program product as claimed in claim 47, further operable to configure a data processing apparatus to perform the step of deriving from the trace signals performance data for use in controlling the compilation of the application code at said step (c).

49. A computer readable medium comprising a computer program as claimed in claim 48.

50. A computer readable medium comprising a computer program as claimed in claim 47.

* * * * *